United States Patent
Milovancevic

[11] 3,756,077
[45] Sept. 4, 1973

[54] VEHICULAR DRIFT INDICATOR-SPEEDOMETER

[76] Inventor: Slavko Milovancevic, P. O. Box 402, Torrance, Calif. 90508

[22] Filed: Apr. 1, 1971

[21] Appl. No.: 130,078

[52] U.S. Cl. ................................................ 73/187
[51] Int. Cl. ............................................. G01c 21/10
[58] Field of Search ..................... 73/187, 186, 184, 73/185, 231 R, 228

[56] References Cited
UNITED STATES PATENTS

| | | | |
|---|---|---|---|
| 3,433,065 | 3/1969 | Mergler | 73/231 R |
| 3,610,039 | 4/1969 | Althouse et al. | 73/231 R |

*Primary Examiner*—Donald O. Woodiel

[57] ABSTRACT

A vehicular drift indicator-speedometer for measuring either vehicular drift or speed, or the rate of flow of a medium. Invention utilizes a transducer in form of an impeller mounted in a circular aperture and having on its axis a cam member used to drive a pair of spring contacts. Said contacts connect and disconnect bias supply to a transistor which conducts accordingly producing square wave pulses. Said pulses are driving circuitry producing a short pulse of constant duration per each drive pulse. Said short pulses of constant duration are then integrated and used to drive an indicating meter.

In all cases a differential pressure developed between ends of said aperture drives a certain amount of medium through it, thus medium drives said impeller and circuitry producing appropriate indication.

When used as a drift indicator said impeller and switch are mounted in said aperture being perpendicular to the direction of the vehicular travel, and being part of the vehicular body or affixed to it as a separate body.

When used as a speedometer aperture is aligned with the vehicular direction of travel, the rest is same as above.

When used as a flow rate indicator, arrangement is such that medium under consideration is moving through the aperture driving an impeller and producing indication as before.

5 Claims, 4 Drawing Figures

Patented Sept. 4, 1973 3,756,077

INVENTOR.
Slavko Milovančević

VEHICULAR DRIFT INDICATOR-SPEEDOMETER

BACKGROUND OF THE INVENTION

1. Field of the invention

The present invention relates generally to measuring instruments and particularly to air and water navigational drift and velocity measuring instruments.

2. Description of the prior art

As far as known to applicant there is no known instrument of this type described or used for vehicular drift or velocity measurements.

DETAILED DESCRIPTION OF OPERATION

The objectives of this invention were : To find an instrument for vehicular drift,speed and/or flow rate of medium measurement insensitive to ambient, i.e., medium temperature changes,sensitive to pressure changes, mechanically robust,simple and inexpensive,and yet accurate enough.

Figure 1:
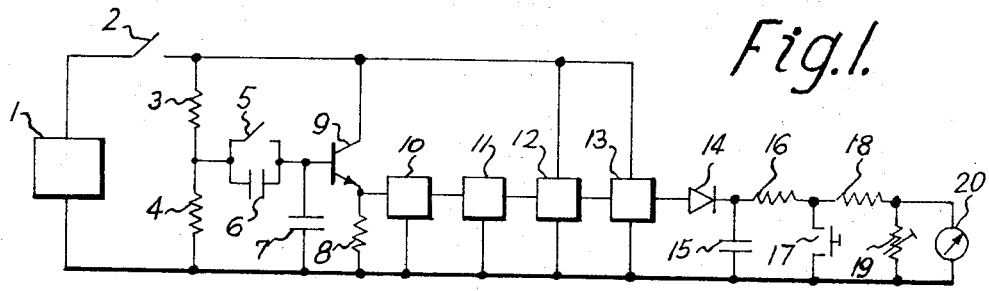
FIG.1 is a combined circuit and block diagram showing all essentials of square wave pulse producing,processing,and indication as function of number of openings and closings of contacts designated 5.
Figure 2:
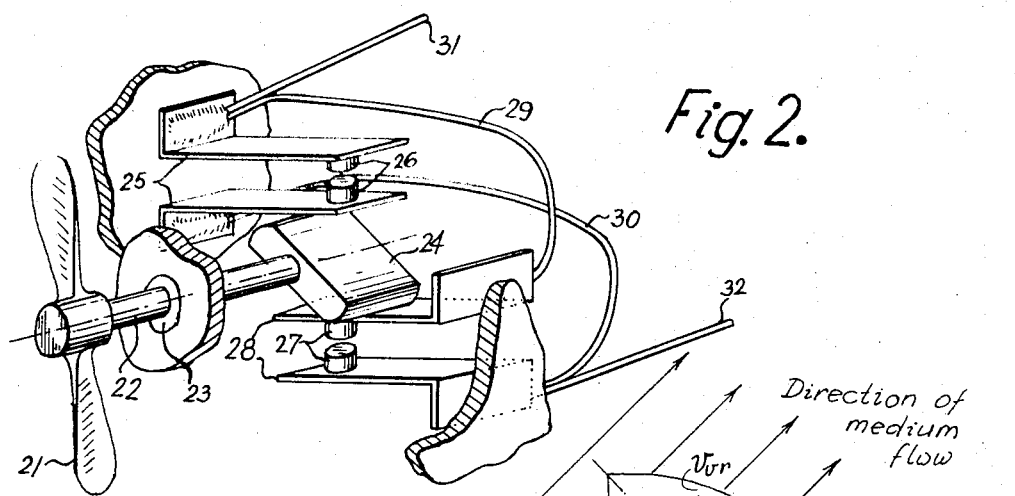
FIG.2 shows two pairs of mechanical contacts activated by propeler rotation.

Referring now to FIG.1,vehicular drift indicator — speedometer of present invention includes a regulated d-c voltage source generally designated 1,a power switch designated 2,three biasing resistors designated 3, 4,and 8,spring contacts 5,two small capacitors 6 and 7,a transistor of n-p-n type designated 9,a differential network generally designated 10,a pulse separation circuit generally designated 11,a square wave forming network generally designated 12,a square wave amplifier generally designated 13,a blocking diode designated 14,a storage capacitor designated 15, two current limiting resistors designated 16 and 18,a pushbutton switch designated 17,a calibration rheostat 19,and a microampermeter or similar type indicator designated 20.Operation is as follows.When switch 2 is closed circuit is supplied with power from source 1,biasing resistors 3 and 4 form a voltage divider charging capacitors 6 and 7.Transistor 9 is in off state.The moment contacts 5 close capacitor 6 discharges through them.At same time transistor 9 will be forward biased and start conducting heavily.Capacitor 7 will slow down turn on of transistor 9 making sure that spikes possibly produced by bouncing of contacts 5 during closing will not be transferred to circuit 10.Once on transistor 9 will enter saturation or near saturation region conducting heavy current to produce voltage drop across resistor 8 nearly equal to supply voltage.When contacts 5 open capacitor 7 will discharge through capacitor 6 which will be charged also through transistor 9,thus keeping transistor 9 for time long enough to assure that contacts 5 are definitely open and prevent possible short spikes production due to bouncing during its opening.Transistor 9 will then stop conducting after a short delay,thus voltage across resistor 6 will drop to zero.Concentrating our attention to resistor 8 during described process one will find a voltage rising from zero to nearly supply voltage,remain at that value as long as contacts 5 are closed,and after a short delay will drop fast to zero representing thus a positive going voltage pulse of rectangular type or rather close to it in form.This same position rectangular voltage pulse is applied to differentiating network designated 10,which will produce a positive going spike across its output during rectangular pulse rise time,no output during flat portion of the pulse,and a negative going spike during rectangular pulse fall time,thus differentiating the rectangular pulse.A single rectangular pulse is then transformed into one positive and one negative going spike.- From FIG.2 is obvious that each propeller rotation will produce two rectangular pulses or in other words each propeler rotation will produce two positive and two negative going spikes at differentiator 10 output.This-,of course,repeats for each rotation of the propeler.- Separation network 11 then passes only either positive or negative type spikes to square wave generator 12 which in turn produces a short duration rectangular pulses of short duration — shorter than shortest one produced by the transistor 9 — one pulse for each spike appearing at its input,thus two pulses per each rotation of the propeler in FIG.2.These pulses of constant duration are then amplified by square wave amplifier 13 and fed through blocking diode 14 to storage capacitor 15.From diode 14 position is obvious that pulses coming from the amplifier 13 must be positive in order to reach and charge positively the capacitor 15.Faster propeller rotates more pulses are produced,more capacitor 15 will be charged positively the higher voltage across it will be developed.This voltage drives a current through current limiting resistors 16 and 18, calibarting rheostat 19 and the meter 20 which indicates how high that voltage across 15 is.Note also that time constant formed by capacitor 15,resistors 16 and 18,calibrating rheostat 19,and internal resistance of indicator 20 must be much longer than the duration of the longest repetition time between pulses produced by transistor 9.Momentary push-button switch 17 serves for fast discharge of capacitor 15 to allow momentary reading on meter 20 or if made as locking type to protect meter from possible overloading.

Referring now to FIG.2 vehicular drift indicator-speedometer of the present invention includes elements 21 through 32 — only essential ones to show principle of operation.Operation of this device is as folows :

Due to medium stream around propeller 21 it will rotate with an angular speed dependent on the stream speed,propeller axle 22 equally so and a profile 24 at the end of the axle.Axial-radial type bearing 23 takes all axial and radial forces and keeps axle and propeller in proper position relative to stream. During its rotation profile 24 depresses springs 25 and 28 causing closing contacts 26 and 27 twice per each rotation and twice to open as well.Springs 25 and 28 are connected in parallel by wires 29 and 30 to increase relability of operation,while conductors 31 and 32 serve as connecting wires to circuit elements 3,4,6,7,and 9 in FIG.1.This way medium flow is transduced in closing and opening of contacts 26 and 27 represented by switch 5 in FIG.1,thus affects circuitry in FIG.1 as described before.

Figure 3:
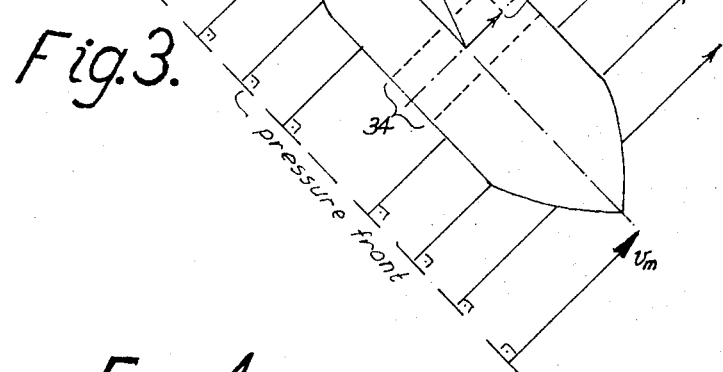
FIG.3 shows an aerodynamically shaped body with a transversal hole where propeler and switches are located,medium flow lines,medium pressure front,and vectorial diagram of involved velocities as related to vehicular drift measurement.

Referring to FIG.3 vehicular drift indicator — speedometer of the present invention includes an aerodynamically shaped body 33 with a circular hole 34. Body 33 is part of the vehicle itself or conveniently affixed to it so that its hole takes a position perpendicular to vehicular direction of motion. Inside the hole 34 is then placed transducer from FIG.2, while connecting wires 31 and 32 are fed to circuitry.

To give a better idea on principle used for operation some vectors are used like vector $v_m$ representing medium velocity, vector $v_v$ vehicular velocity in the intended direction of motion, vector $v_{vm}$ vehicular drifting velocity due to medium flow, and $v_{vr}$ resulting vehicular velocity. Note that $v_m$ and $v_{vm}$ are not equal, that $v_m$ is larger, thus there will be a difference in pressure on both sides of vehicle and body 33 as well. Due to this difference in pressure medium will flow through the hole 34 activating device in FIG.2.

Figure 4:
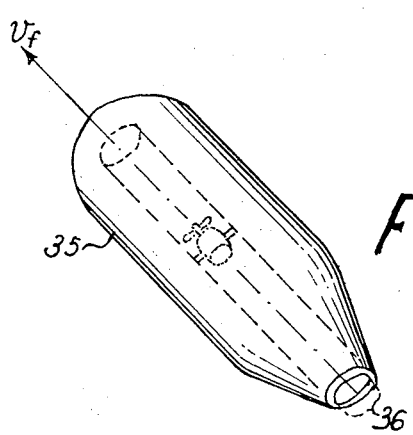
FIG.4 shows an aerodynamically shaped body with an axial hole where transducer from FIG.2 is located,when speed or flow rate is being measured.

Referring to FIG.4 it is obvious that similar arrangement can be used to measure vehicular speed or the flow rate through the hole 36 in the aerodynamically shaped body 35.

This is only one of many possible solutions which all fall within the scope and essence of this invention.

I claim :

1. An Indicator for indicating the velocity of a vehicle relative to a medium in which the vehicle is travelling, and comprizing :

an impeller rotatably mounted on said vehicle and in communications with said medium, a cam member attached to said impeller and rotatable therewith, switch contact means mounted opposite said cam member, said switch contact means being actuated by said cam member in accordance with the rotation of the impeller, an electrical power source for providing voltage for operation of electrical circuitry through a common lead and a power switch whose other terminal is connected to the other lead supplying power to:

a series connection of two resistors, one being connected with one end to said common terminal, second resistor being connected to said other lead, an n-p-n type transistor having emitter, base and collector electrodes, said collector electrode being connected to said other lead, emitter electrode being connected to a resistor whose other end is connected to said common terminal, a capacitor connected between the base electrode of said transistor and the interconnection of said two in series connected resistors ; said switch contact means being connected across said capacitor (as shown in FIG.1) providing drive current for said transistor whenever said switch contact means is closed, said drive current causes conduction of said transistor, thus producing a rectangular voltage pulse across said resistor, a differentiator having its input lead connected to interconnection of said resistor and said transistor for accepting said rectangular voltage pulse across said resistor, having its common lead connected to said common lead, and its output lead connected to a pulse separation network input lead, allowing passage of differentiating pulses of desired polarity (differentiating pulses representing a positive going and a negative going sharp pulse produced by differentiator per each rectangular voltage pulse), and having its common lead connected to said common lead, and its output lead connected to the input lead of a means for producing rectangular pulses of same amplitude and constant duration and same in number as the rectangular pulses produced by said transistor, having its common lead connected to said common lead, its supply lead connected to said other lead to accept electric power, and its output lead connected to the input lead of a square wave amplifier having its common lead connected to said common lead, its supply lead to said other lead to receive electric power for operation and its output lead connected to the anode electrode of a :

diode having its cathode connected to an integrating capacitor having its other plate connected to said common lead, and used to integrate said pulses of constant duration, first current limiting resistor tied up to the interconnection of said diode and said capacitor, and its other end connected to a pushbutton switch to allow fast discharge of said integrating capacitor through said first current limiting resistor and another current limiting resistor connected to interconnection of said first current limiting resistor and said pushbutton switch, a calibrating rheostat connected to said common lead and its other end to the other end of said second current limiting resistor and a readout means for providing a readout of the output of said integrating means and having its other lead connected to said common lead.

2. The indicator of claim 1 wherein the drift of the vehicle is indicated and further comprising :

a duct supported on said vehicle so it is exposed to the medium surrounding the vehicle, said duct having an aperture facing in a direction substantially normal to principal direction of travel of said vehicle, said aperture providing communication of said medium to the inside of said duct, said impeller being rotatably mounted within the casing, the rotation axis of the impeller being substantially normal to the principal direction of vehicular travel, said impeller being rotatably driven in accordance with the velocity of the medium entering the duct.

3. The indicator of claim 1 wherein the speed of the vehicle is indicated and further comprising :

a duct supported on said vehicle so it is exposed to the medium surrounding the vehicle, said duct having an aperture facing in substantially same direction as the principal direction of travel of said vehicle, said aperture providing communication of said medium to the inside of said duct, the rotation axis of said impeller being in substantially same direction as the principaldirection of vehicle travel, said impeller being rotatably driven in accordance with the velocity of the medium enterring the duct.

4. The indicator of claim 1 wherein said switch contact means comprises two pairs of switch contacts and separate resilient arm means for supporting each of the contact pairs, said arm means being positioned in the rotation path of the cam member.

5. An indicator for indicating the rate of flow of a medium through an axial aperture of a cylindrical body and comprising :
- a rotation axis supported by said cylindrical body and being coaxial with it and further comprising :
- an impeller rotatably mounted on said cylindrical body and in communications with said medium,
- a cam member attached to said impeller and rotatable therewith,
- switch contact means mounted opposite said cam member, said switch contact means being actuated by said cam member in accordance with the rotation of the impeller,
- an electrical power source for providing voltage for operation of electrical circuitry through a common lead and through a
- power switch whose other terminal is connected to the other lead supplying power to :
- a series connection of two resistors, one being connected with one end to said common terminal, second resistor being connected to said other lead,
- an n-p-n transistor having emitter, base and collector electrodes, said collector electrode being connected to said other lead, said emitter electrode being connect to a
- resistor whose other end is connected to said common terminal,
- a capacitor connected between the base electrode of said transistor and the interconnection of said two in series connected resistors ; said switch contact means being connected across said capacitor (as shown in FIG.1) providing drive current for said transistor whenever said switch contact means is closed, said drive current causes conduction of said transistor, thus producing a rectangular voltage pulses across said resistor,
- a differentiator having its input lead connected to interconnection of said resistor and said transistor for accepting said rectangular voltage pulses across said resistor, having its common lead connected to said common lead, and its output lead connected to a
- pulse separation network input lead, allowing passage of differentiating pulses of desired polarity (differentiating pulses representing a positve going and a negative going sharp pulse produced by differentiator per each rectangular voltage pulse), and having its common lead connected to said common lead, and its output lead connected to the input lead of a
- means for producing rectangular pulses of same amplitude and constant duration and same in number as the rectangular pulses produced by said transistor, having its common lead connected to said common lead, its supply lead connected to said other lead to accept electric power, and its output lead connected to the input lead of a
- square wave amplifier having its common lead connected to said common lead, its supply lead to said other lead to receive electric power for operation and its output lead connected to the anode electrode of a
- diode having its cathode connected to an
- integrating capacitor having its other plate connected to said common lead and used to integrate said pulses of constant duration,
- first current limiting resistor tied up to the interconnection of said diode and said capacitor, and its other end connected to a
- pushbutton switch to allow fast discharge of said integrating capacitor through said first current limiting resistor and
- another current limiting resistor connected to interconnection of said first current limiting resistor and said pushbutton switch,
- a calibrating rheostat connected to said common lead and its other end to the other end of said second current limiting resistor and a
- readout means for providing a readout of the output of said integrating means and having its other lead connected to said common lead.

* * * * *